United States Patent
Ikeda et al.

(10) Patent No.: US 7,303,807 B2
(45) Date of Patent: Dec. 4, 2007

(54) COVER OF LIGHTING UNIT FOR VEHICLE

(75) Inventors: Toshimasa Ikeda, Shizouka (JP); Masami Nakajima, Shizouka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 26 days.

(21) Appl. No.: 10/825,682

(22) Filed: Apr. 16, 2004

(65) Prior Publication Data

US 2005/0003159 A1    Jan. 6, 2005

(30) Foreign Application Priority Data

Apr. 18, 2003 (JP) ............... P. 2003-113812

(51) Int. Cl.
  *B32B 3/00* (2006.01)
  *F21V 7/00* (2006.01)
  *F21V 5/00* (2006.01)

(52) U.S. Cl. .............. 428/172; 428/166; 362/518; 362/522

(58) Field of Classification Search ............ 428/166, 428/167, 172, 207; 359/642; 362/303, 305, 362/214, 215, 509, 510, 517, 518, 520, 522, 362/539

See application file for complete search history.

(56) References Cited

U.S. PATENT DOCUMENTS 4,654,761 A * 3/1987 Walsh .................. 362/521
5,413,743 A * 5/1995 Prophet ................ 264/1.7

FOREIGN PATENT DOCUMENTS

| DE | 89 04 240 U1 | 4/1989 |
|----|---|---|
| DE | 44 17 404 C2 | 5/1994 |
| EP | 0 036 305 A1 | 9/1981 |
| FR | 2 172 126 A1 | 9/1973 |
| FR | 2 172 127 A1 | 9/1973 |
| FR | 2 301 357 A1 | 9/1976 |
| JP | 5-90708 U | 12/1993 |
| JP | 06-328499 A | 11/1994 |
| KR | 1998-0049692 A | 9/1998 |

* cited by examiner

Primary Examiner—Donald J. Loney
(74) Attorney, Agent, or Firm—Sughrue Mion Pllc.

(57) ABSTRACT

A lighting unit cover including a deep color (first) resin layer subject to preblanking is laminated and molded in a predetermined position on a backside of a light color (second) resin layer on a surface side subject to postblanking. The second layer protrudes toward the first layer side and a boundary surface between the first and second layers and is offset by a distance toward the first layer side in a laminated portion. The first layer contacts the melted second resin and is subject to postblanking so that a part thereof is molten and drawn by its flow. A step portion in a cavity corresponding to a protruded portion of the second layer toward the first layer side blocks the flow of the molten first resin into the second layer. The first resin is not mixed into the first layer, resulting in excellent appearance and a large light emitting area.

13 Claims, 8 Drawing Sheets

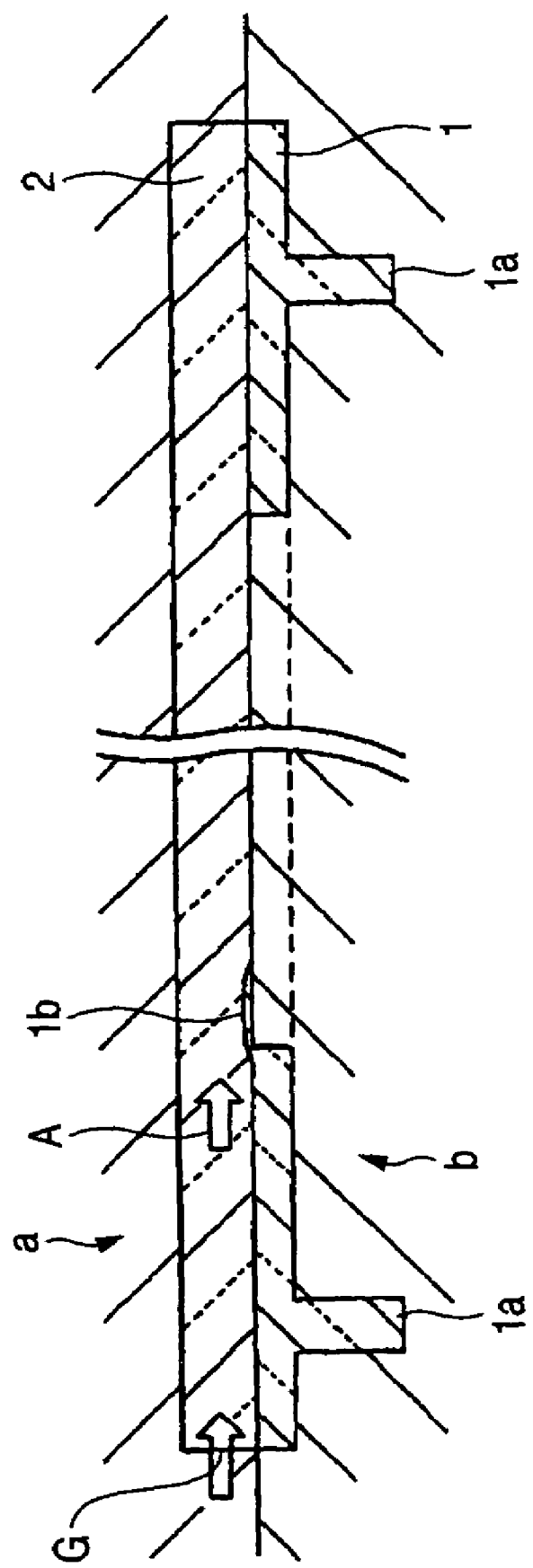

COVER OF LIGHTING UNIT FOR VEHICLE

This application claims foreign priority based on Japanese patent application No. JP-2003-113812, filed on Apr. 18, 2003, the contents of which is incorporated herein by reference.

BACKGROUND OF THE INVENTION

1. Technical Field

The present invention relates to a cover of a lighting unit for a vehicle in which a first resin layer having a deep color is laminated in a predetermined position on the backside of a second resin layer having a light color on a surface side.

2. Related Art

In the related art lighting unit for a vehicle, a first resin layer 1 having a deep color (for example, a black color) is laminated in a peripheral edge position on the back side of a second resin layer 2 having a light color (for example, a clear color) on a surface side, as shown in FIG. 8. The reference numeral 1a denotes a seal leg formed along a peripheral edge portion on the back face of the cover.

To form the cover, a primary molded product (the first resin layer 1 having the deep color) formed by preblanking is moved and mounted, and is then inserted in metal molds a and b. The second resin layer 2 having the light color is subjected to postblanking and is thus laminated and molded. The designation G denotes a side gate for the injection molding of the second resin.

In the injection molding of the second resin 2 subjected to the postblanking, however, the first resin layer 1 subjected to the preblanking contacts the second resin 2 in a melting state which is subjected to the postblanking. As a result, a part of the first resin layer 1 is molten. Consequently, the molten first resin 1 is drawn by the flow of the second resin 2 as shown in an arrow A of FIG. 8 and is thus mixed into the second resin layer 2 as shown in 1b. Consequently, there is a problem in that an appearance is poor when a lighting unit is turned off and a light is not emitted to have a predetermined functional color when the lighting unit is turned on.

In JP-U-05-090708 <Japanese Utility Model application publication> (see FIGS. 9(a) and 9(b)), there has been disclosed a cover of a lighting unit for a vehicle in which a first resin layer 1 having a deep color is laminated and molded in a peripheral edge position on the back side of a second resin layer 2 having a light color (for example, a clear color) on a surface side, the cover having such a structure that a convex portion 4 to bring the first resin 1 in the postblanking of the second resin 2 is formed on the peripheral edge of the opening portion of the first resin layer 1 subjected to preblanking, a penetrating portion 1b of the first resin 1 is caught into the convex portion 4 and the penetrating portion 1b of the first resin 1 is not mixed into a light emitting portion 5 of the cover. An arrow in FIG. 9(b) indicates the direction of the flow of the second resin 2 injected into a metal mold.

However, the related art has various problems and disadvantages. For example, but not by way of limitation, in the cover described in JP '708 it is certain that the first resin 1 is not mixed into the light emitting portion 5 of the cover, and the shape of the cavity of the metal mold becomes complicated, corresponding to the convex portion. Also, the size of the light emitting portion 5 is reduced corresponding to the convex portion 4 so that the light emitting area of the cover is decreased when a lighting unit is turned on. Furthermore, there is a problem in that the peripheral edge portion (the convex portion 4) of the light emitting portion 5 constituted by a single layer of a second resin looks dirty when the lighting unit is turned off and the appearance is thus poor.

SUMMARY OF THE INVENTION

It is an object of the invention to provide a cover of a lighting unit for a vehicle which has such a structure that colors are not mixed with each other in the single layer portion of a dichroic molded cover without complicating the shape of the cavity of a metal mold, so that a large light emitting area can be maintained when the lighting unit is turned on and an appearance can be enhanced when the lighting unit is turned off. However, this object need not be achieved, and further, no object needs to be achieved, in the present invention.

A first aspect of the invention is directed to a cover of a lighting unit for a vehicle in which a first resin layer having a deep color which is subjected to preblanking is laminated and molded in a predetermined position on a back side of a second resin layer having a light color on a surface side which is subjected to postblanking, wherein the second resin layer is protruded toward the first resin layer side and a boundary surface between the first and second resin layers is offset toward the first resin layer side in the laminated portion.

The molding is carried out to have such a configuration that the second resin layer having the light color is provided on the first resin layer having the deep color which is previously molded. When the second resin layer is to be injection molded, the first resin layer subjected to the preblanking comes in contact with the second resin in a melting state which is subjected to the postblanking so that a part thereof is molten and is drawn by the flow of the second resin. However, a step portion in a cavity corresponding to the protruded portion of the second resin layer toward the first resin layer side in the laminated portion (a step portion corresponding to the amount of offset on a boundary surface between the first and second resin layers) acts as a barrier for blocking the flow of the molten first resin into the second resin layer.

Moreover, it is preferable that the amount of the first resin which is subjected to the preblanking should be decreased and the amount of the second resin which is subjected to the postblanking should be increased correspondingly. Consequently, the shape of the cavity in the metal mold can be prevented from being complicated.

A second aspect of the invention is directed to the cover of a lighting unit for a vehicle according to the first aspect of the invention, wherein the protruded portion on the second resin layer side in the laminated portion is provided in at least a region in which the second resin flowing after the postblanking is moved from a laminated layer to a single layer.

The first resin having the deep color is mixed into the second resin layer having the light color in a position where the second resin which is subjected to the postblanking flows and is moved from a two-layer (a laminated layer) to a single layer. Therefore, it is sufficient that a protruded portion is provided in at least the predetermined region of the laminated portion (a position in which the second resin flows and is moved from the two-layer to the single layer).

BRIEF DESCRIPTION OF THE DRAWINGS

FIG. 8 is a sectional view showing a related art dichroic molded cover.

DETAILED DESCRIPTION OF THE INVENTION

Figure 1:
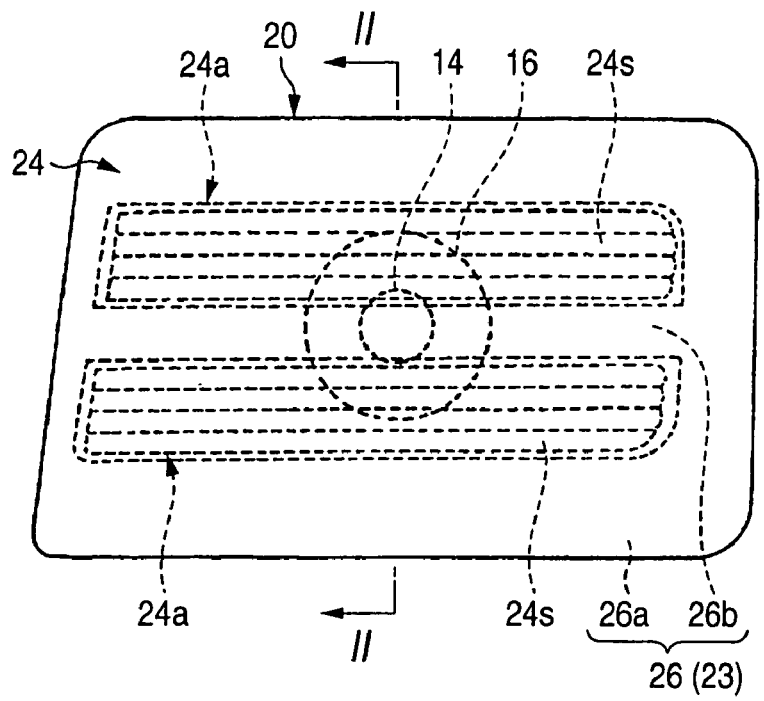
FIG. 1 is a front view showing a tail and stop lamp according to an exemplary, non-limiting embodiment of the present invention.
Figure 2:
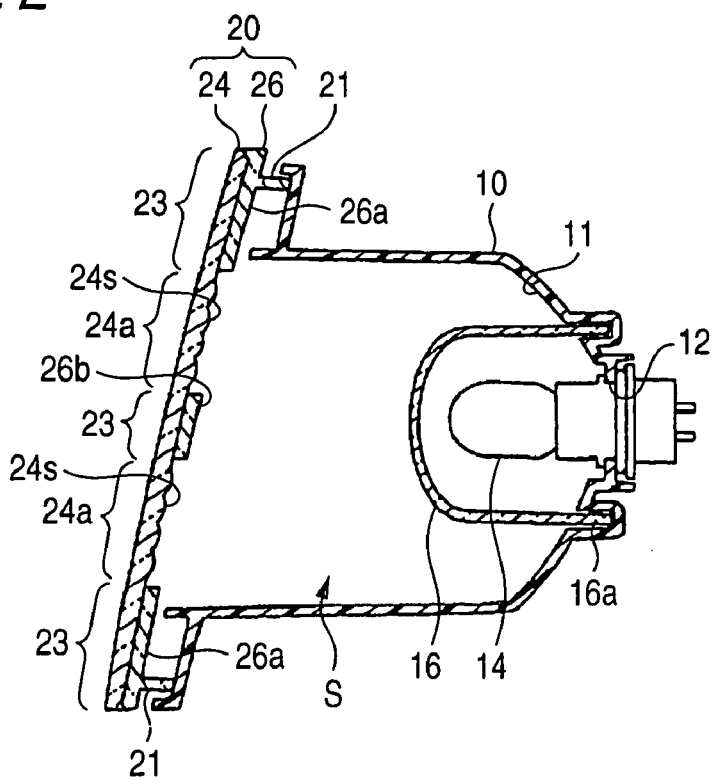
FIG. 2 is a vertical sectional view showing the lamp (a sectional view taken along a line II-II in FIG. 1) according to an exemplary, non-limiting embodiment of the present invention.

An embodiment of the invention will be described based on an exemplary, non-limiting embodiment.

FIGS. 1 to 5 show an according to an exemplary, non-limiting embodiment of the present invention. In these drawings, the reference numeral 10 denotes a container-shaped lamp body of a tail and stop lamp. A front surface cover 20 is assembled into the opening portion of the front surface of the lamp body 10 so that a lamp housing S is formed. The reference numeral 21 denotes a seal leg provided close to a peripheral edge portion on the back side of the front surface cover 20, which is fixed to the front edge portion of the lamp body 10 by ultrasonic welding, for example.

A reflector 11 taking the shape of a paraboloid includes aluminum evaporated and is formed on the inner peripheral surface of the lamp body 10. Furthermore, a white bulb 14 to be a light source is inserted and attached into a bulb insertion hole 12 provided on the rear top portion of the lamp body 10. A red cap 16 fixing a leg portion 16a around the bulb insertion hole 12 is provided around the white bulb 14, and a light (having a white color) emitted from the white bulb 14 is transmitted through the red cap 16 and thus becomes reddish.

The front surface cover 20 is a dichroic molded cover obtained by laminating and integrating a second resin (acrylic resin) layer 24 having a clear color on a surface side forming the whole shape of the cover and a first resin (acrylic resin) layer 26 having a dark (for example but not by way of limitation, black) color which is extended transversely with predetermined widths in the whole region of a peripheral edge portion on the back side of the second resin layer 24 and a central portion in a vertical direction respectively. In the present invention, "clear" is defined as a color of the resin in which light may be transmitted or passed through, as opposed to being blocked, as is the case for the dark or black colored resin.

The reference numeral 26a denotes a peripheral edge portion region of the first resin layer 26 and the reference numeral 26b denotes a bar-shaped portion region on a center in the vertical direction of the first resin layer 26

The second resin layer 24 is laminated in the whole region of the first resin layer 26 so that a laminated portion 23 is constituted. Moreover, a transversely extended cylindrical step 24s is provided on the back side of a region 24a of the second resin layer 24 to be a single layer in which the first resin layer 26 and the second resin layer 24 are not laminated.

In the laminated portion 23 including the first resin layer 26 and the second resin layer 24, the first resin layer 26 having the black color on the back side is seen through the second resin layer 24 having the clear color on the surface side when the lamp is turned off. As shown in FIG. 1, therefore, two upper and lower light emitting portion regions 24a and 24a which are formed by the single layer of the second resin layer 24 having the clear color and are transversely long are seen to be black-rimmed by the laminated portion 23 formed by the peripheral edge portion region 26a provided along the peripheral edge portion of the cover and the bar-shaped portion region 26b provided on the center in the vertical direction.

On the other hand, when the lamp is turned on, a light cannot be transmitted through the first resin layer 26 having the black color on the back side of the cover 20. For this reason, the light emitting portion regions 24a and 24a having the clear color transmit a red light on the lamp housing S side and thus emit a light having a red color to be a functional color.

Figure 3:
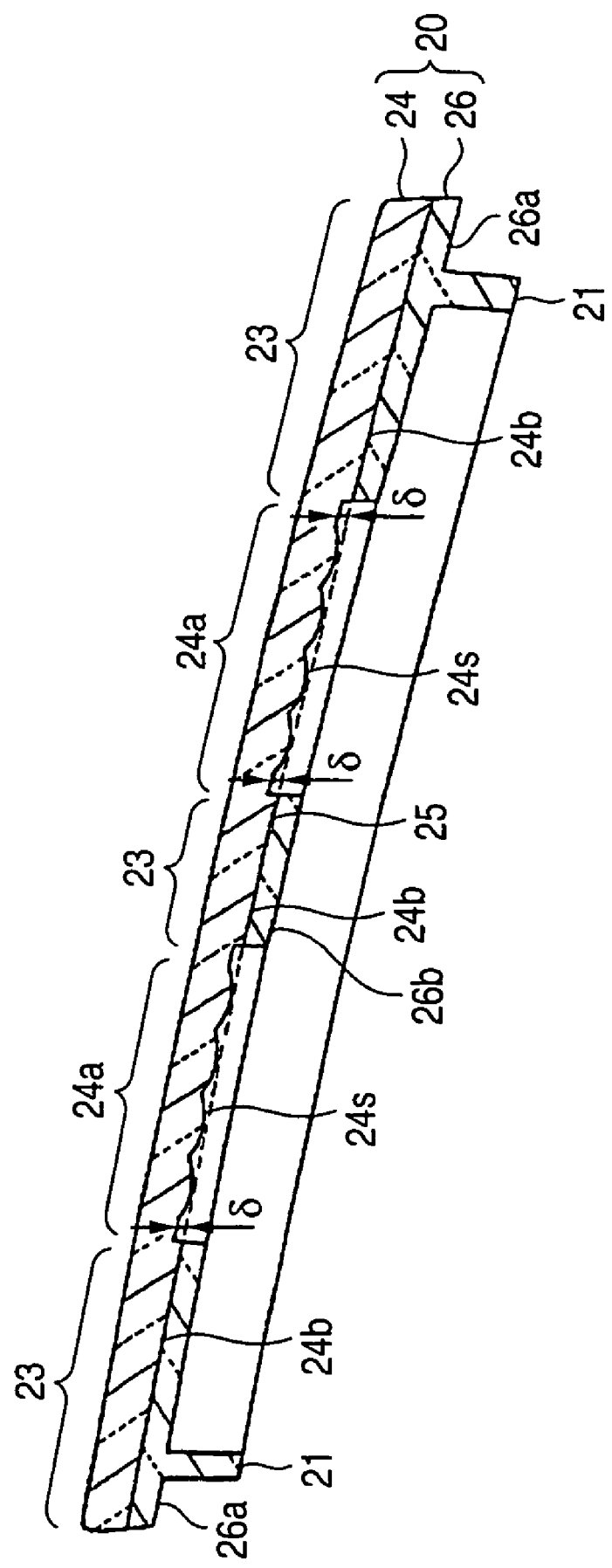
FIG. 3 is a sectional view showing a front surface cover to be the main part of the lamp according to an exemplary, non-limiting embodiment of the present invention.

As shown in FIG. 3, the laminated portion 23 obtained by laminating the first resin layer 26 and the second resin layer 24 in the cover 20 is constituted to have such a configuration that the second resin layer 24 is protruded toward the first resin layer 26 side and a boundary surface 25 between the first and second resin layers 26 and 24 is offset toward the first resin layer 26 side by a predetermined value δ as shown in reference numeral 24b. The cover 20 is formed by carrying out the postblanking over the second resin layer 24 having the clear color with respect to the first resin layer 26 having the black color, which is subjected to preblanking. Thus, there is obtained a dichroic molded cover structure in which the first resin 26 having the black color is not mixed into the second resin layer 24 having the clear color to be subjected to the postblanking.

Figure 4:
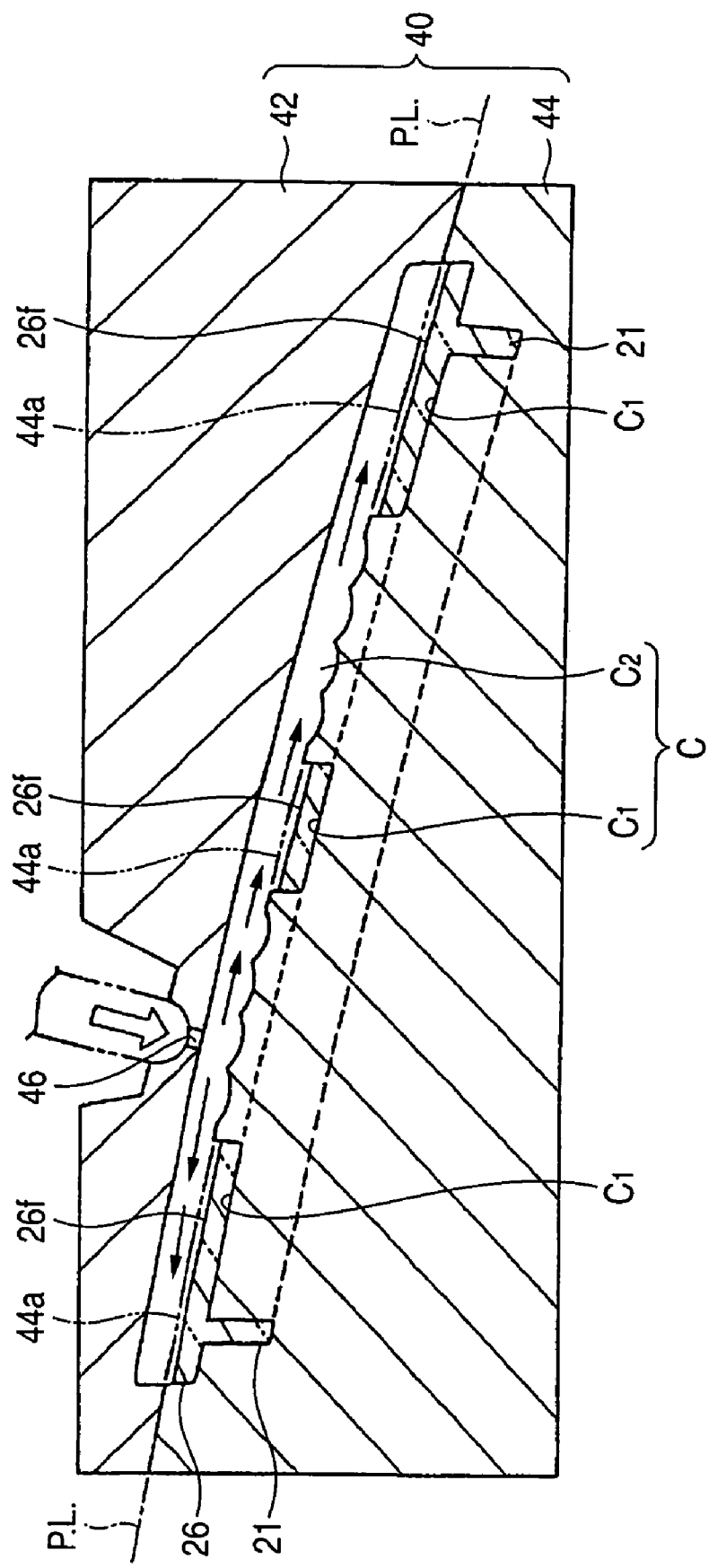
FIG. 4 is a sectional view showing a flow in the metal mold of a second resin subjected to postblanking according to an exemplary, non-limiting embodiment of the present invention.

As shown in FIG. 4, to form the cover 20, the first resin layer 26 having the deep color to be a primary molded product having a predetermined thickness is formed by a metal mold for primary molding (not shown). Next, the primary molded product (the first resin layer 26) is taken out of the metal mold for primary molding and is inserted into a metal mold 40 for secondary molding (upper and lower metal molds 42 and 44).

A cavity C, including a first cavity portion C1 for laminated portion molding which is formed on the lower metal mold 44 side and a second cavity portion C2 for second resin layer molding which is formed on the upper metal mold 42 side is provided in the metal mold 40 for secondary molding (the upper and lower metal molds 42 and 44). A surface 26f of the primary molded product (the first resin layer 26) inserted in the cavity portion C1 for laminated portion molding is placed in a position retracted by a predetermined distance δ from a back molded surface 44a of the second resin layer 24 extended almost straight along a parting line P.L. into the cavity portion C1 (a position offset by the predetermined distance δ).

Then, the metal molds 40 (42, 44) is clamped and the second resin 24 is injected into the cavity C (more specifically, C2) of the metal mold 40 (42, 44) through a direct gate 46 provided in the upper metal mold 42. The second resin 24 injected into the cavity C (more specifically, C2) flows in the cavity C2 radially from the position of the gate 46 and fills the whole cavity C (more specifically, C2).

Figure 5:
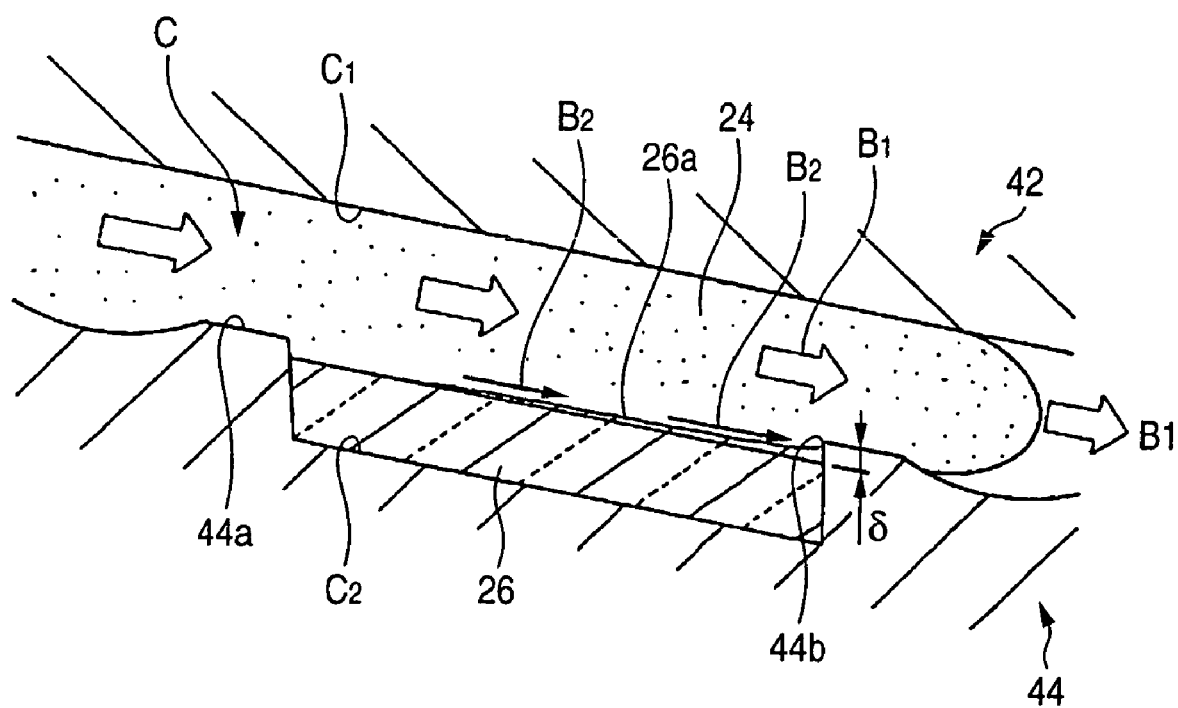
FIG. 5 is an explanatory view showing an action for blocking the flow of a first resin into the second resin by the step portion of a cavity according to an exemplary, non-limiting embodiment of the present invention.

At this time, and as shown in FIG. 5, the surface 26f of the previously inserted primary molded product (the first resin layer 26) contacts with the flowing second resin 24 in a melting state having a high temperature so that a part thereof is molten. The molten first resin 26 is drawn by the flow (see an outlined arrow B1 in FIG. 5) of the second resin 24 (see an arrow B2 in FIG. 5).

However, a step portion 44b in the cavity portion C1 corresponding to the protruded portion 24b of the second resin layer 24 toward the first resin layer 26 side in the laminated portion 23 (a step portion corresponding to an offset amount δ of the boundary surface 25 between the first and second resin layers 26 and 24) acts as a barrier for blocking the flow of the molten first resin 26 into the second resin 24. Therefore, the molten first resin 26 is not mixed into the second resin layer 24 but is caused to stay in the cavity portion C2 for laminated portion molding.

As a result, in the front surface cover 20 the first resin 26 having the black color is not mixed into the light emitting portion region 24a to be the single layer region of the second resin layer 24 having the clear color on the surface side (see FIG. 3).

It was experimentally confirmed that a height δ of the protruded portion 24b of the second resin layer 24 toward the first resin layer 26 side in the laminated portion 23 in which the first and second resin layers 26 and 24 are laminated (an offset amount of the boundary surface 25 between the first and second resin layers 26 and 24 toward the first resin layer 26 side) is desirably about 0.2 to 0.8 mm.

While the whole second resin layer 24 in the laminated portion 23 is uniformly protruded toward the first resin layer 26 side in the example, the mixture of a part of the first resin 26 molten in the secondary molding into the second resin layer 24 is mainly generated where the second resin 24 subjected to the postblanking flows, and is moved from a two-layer (laminated portion) into a single layer. Therefore, it is also possible to employ such a structure that the protruded portion is provided only in the position where the second resin 24 flows and is moved from the laminated portion to the single layer region.

Figure 6:
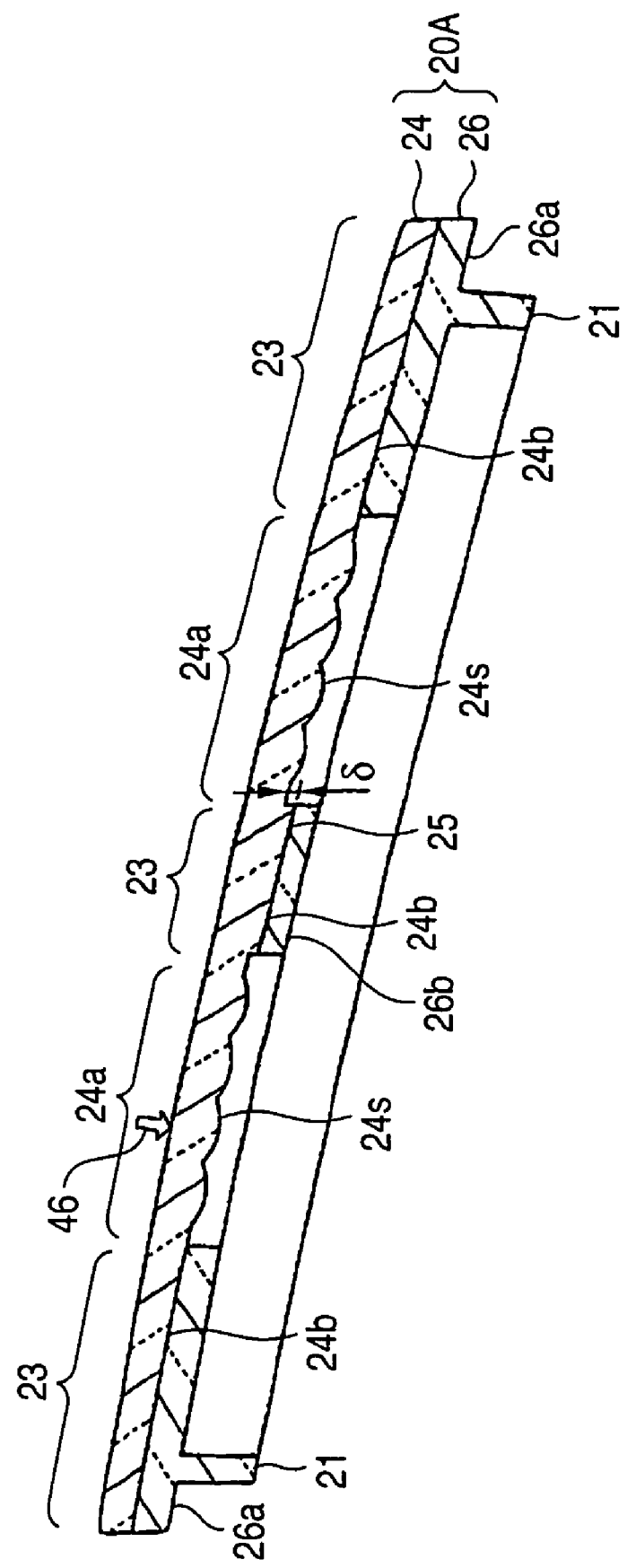
FIG. 6 is a sectional view showing a front surface cover to be the main part of a tail and stop lamp to be a main part according to a second exemplary, non-limiting embodiment of the present invention.

Additionally, other exemplary, non-limiting embodiments of the present invention may be provided. For example, but not by way of limitation, it is possible to employ such a structure that the protruded portion 24b is formed in only the second resin layer 24 of the laminated portion 23 extended transversely on a central part in the vertical direction of a front surface cover 20A seen from a front as shown in FIG. 6.

Figure 7:
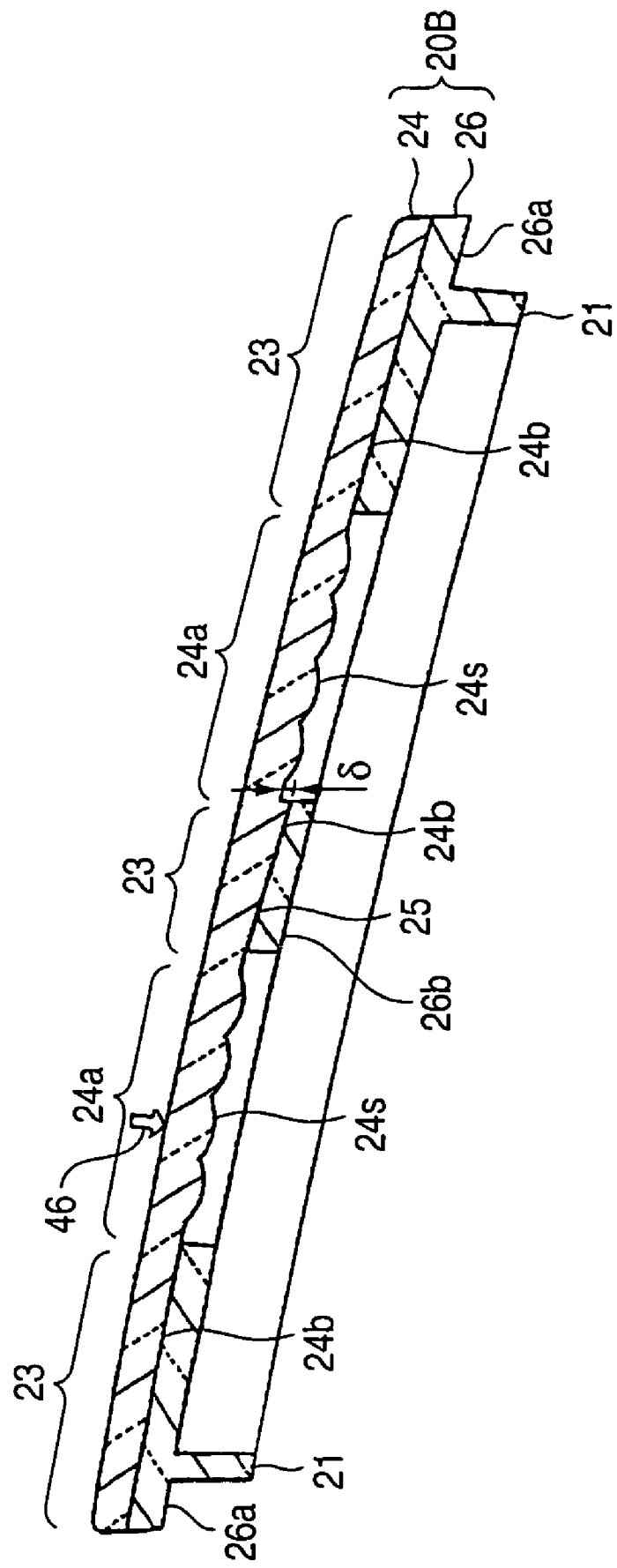
FIG. 7 is a sectional view showing a front surface cover to be the main part of a tail and stop lamp to be a main part according to a third exemplary, non-limiting embodiment of the present invention.
Figure 9A:
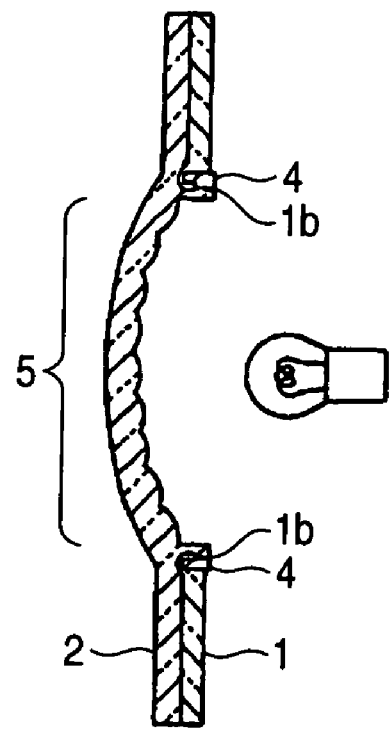
FIGS. 9A and 9B are a sectional views showing another related art dichroic molded cover.
Figure 9B:
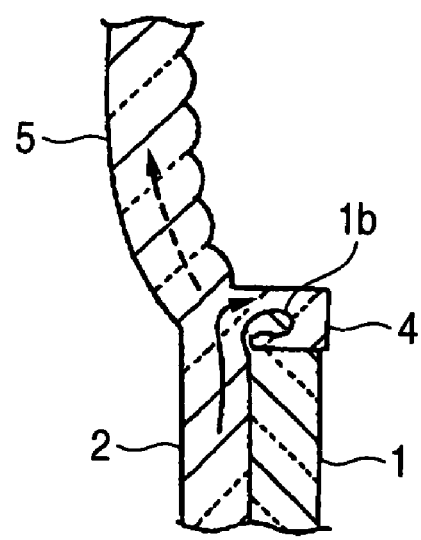

Alternatively, in a third exemplary, non-limiting embodiment of the present invention, as shown in FIG. 7, the protruded portion 24b is formed on only a side of the second resin layer 24 in the laminated portion 23 extended transversely on a central part in the vertical direction of a front surface cover 20B seen from a front in which the second resin 24 injected in the secondary molding flows from the laminated portion 23 to the single layer (a position on the flow side of the injected second resin 24 from the laminated portion 23 to the single layer).

While the description has been given to the dichroic molded structure having the acrylic resin layer 26 having a light color (clear) on the surface side and the acrylic resin layer 24 having a deep color (black) on the back side in the example, a resin material is not restricted to the acrylic resin. Further, the color is not restricted to "clear" and "black", and other equivalents thereto as would be known to those skilled in the art may be used.

Although the front surface cover of the tail and stop lamp has been described in the example, the invention can also be applied to a front surface cover for a clearance lamp, a back-up lamp, a turn signal lamp or other beacon lights or an inner cover to be accommodated in a lamp housing.

The present invention has various advantages, but does not need to have any advantages to properly operate. For example but not by way of limitation, as is apparent from the description, according to the cover of a lighting unit for a vehicle in accordance with the first aspect of the invention, a first resin having a deep color is not mixed into a second resin layer having a light color on a surface side. Therefore, it is possible to obtain a cover having an excellent appearance in which a large light emitting area can be acquired when a lighting unit is turned on and a classification into a single color portion of the second resin layer on the surface side and a mixed color portion of the first and second resin layers is clearly carried out when the lighting unit is turned off.

Moreover, the shape of a cavity in a metal mold is not complicated. Therefore, it is possible to prevent the structure of a metal mold and a design thereof from being complicated.

According to the second aspect of the invention, since the first resin having the deep color contains a dye and a pigment in a large amount, it requires a higher cost than that of the second resin having the light color. However, the amount of the resin material can be decreased corresponding to a protruded portion. Consequently, the price of a cover can be reduced correspondingly.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

We claim:

1. A cover of a lighting unit for a vehicle, comprising:
a first resin layer having a first color; and
a second resin layer having a second color, laminated and molded to said first resin layer on a back side of the second resin layer, and positioned on a surface side of said cover,
wherein at least a portion of the second resin layer protrudes toward the first resin layer side, and a boundary surface between the laminated first and second resin layers at said protruding portion is offset toward the first resin layer side relative to the back side of the second resin layer adjacent said protruding portion;
and wherein the second resin layer is laminated to the first resin layer at least at an interior portion of the cover, away from the edges of the cover.

2. The cover of claim 1, wherein the protruded portion on the second resin layer side in the laminated portion is provided in at least a region in which the second resin is moved from a laminated layer to a single layer.

3. The cover of claim 1, wherein said boundary surface is offset by about 0.2 to 0.8 mm.

4. The cover of claim 1 wherein said first color of said first resin layer substantially blocks light from said lighting unit, and said second color of said second resin layer substantially transmits said light.

5. The cover of claim 4, wherein said first color is black and said second color is clear.

6. The cover of claim 1, wherein said at least said portion comprises one of: (a) a first side of a part of the boundary positioned between light transmission regions of the light cover; (b) said part of the boundary positioned between light transmission regions of the light cover; and (c) said boundary.

7. A cover of a lighting unit for a vehicle, comprising:
a first resin layer having a first color; and
a second resin layer having a second color;
wherein the second resin layer is laminated to said first resin layer on a back side of the second resin layer, and is positioned on a surface of said cover,
wherein at least a portion of the second resin layer protrudes toward the first resin layer side;
wherein the first and second resin layers meet at the protruded portion of the second resin layer to form a boundary surface where the first and second resin layers meet;
wherein the boundary surface is offset toward the first resin layer side relative to the back side of the second resin layer adjacent said protruding portion; and
wherein the second resin layer and the first resin layer meet at least at an interior portion of the cover, away from the edges of the cover.

8. The cover of claim 7, wherein the second resin layer is laminated to the first resin layer at all of the portions of the first resin layer facing the back side of the second resin layer.

9. The cover of claim 8, wherein light emitting regions of the second resin layer are bordered on their back side by an empty space.

10. The cover of claim 7, wherein said boundary surface is offset by about 0.2 to 0.8 mm.

11. The cover of claim 7, wherein said first color of said first resin layer substantially blocks light from said lighting unit, and said second color of said second resin layer substantially transmits said light.

12. The cover of claim 11, wherein said first color is black and said second color is clear.

13. The cover of claim 7, wherein said at least said portion comprises one of: (a) a first side of a part of the boundary positioned between light transmission regions of the light cover; (b) said part of the boundary positioned between light transmission regions of the light cover; and (c) said boundary.

* * * * *